United States Patent [19]
Droegemueller et al.

[11] Patent Number: 4,966,444
[45] Date of Patent: Oct. 30, 1990

[54] FEEDBACK-FREE OPTICAL ARRANGEMENT FOR CONVERTING POLARIZED LASER EMISSIONS INTO A CONVERGENT BEAM

[75] Inventors: Karsten Droegemueller, Munich; Franz Mayerhofer, Puchheim; Ekkehard Klement; Ulrich Deserno, both of Munich, all of Fed. Rep. of Germany

[73] Assignee: Siemens Aktiengesellschaft, Berlin and Munich, Fed. Rep. of Germany

[21] Appl. No.: 137,080

[22] Filed: Dec. 23, 1987

[30] Foreign Application Priority Data

Jan. 14, 1987 [DE] Fed. Rep. of Germany ....... 3700897

[51] Int. Cl.$^5$ .............................................. G02F 1/09
[52] U.S. Cl. ................................ 350/376; 350/96.13; 350/379
[58] Field of Search ............... 350/375, 376, 377, 378, 350/379, 411, 96.13

[56] References Cited

FOREIGN PATENT DOCUMENTS

59-67502 4/1984 Japan .................................. 350/376

OTHER PUBLICATIONS

English abstract of JP, A, 57-173992, (10-26-82).
Shirasaki, M., et al., "Compact Optical Isolator for Fibers Using Birefringent Wedges," *Applied Optics*, vol. 21, No. 23, Dec. 1, 1982, pp. 4296-429.
Chikama, et al., "Distributed-Feedback Laser Diode Module with a Novel and Compact Optical Isolator for Gigabit Optical Transmission Systems", paper ME4, Conference on Optical Fiber Communications (OFC).
Sakano et al., "1.5 m DFB-LD Module with Optical Isolator", Conference on Optical Fiber Communications (OFC), 1985, San Diego, CA, paper PD 13-1, 1985.
Sugie et al., "Distributed Feedback Laser Diode (DFB-LD) to Single Mode Fiber Coupling Module with Optical Isolator for High Bit Rate Modulation", Journal of Lightwave Tech. vol. LT-4, No. 2, Feb. 1986.
Sugie et al., "An Effective Nonreciprocal Circuit for Semiconductor Laser-to-Optical-Fiber Coupling Using A YIG Sphere", Journal of Lightwave Tech, vol. LT-1, No. 1, Mar. 1983.
Peterman, "Noise and Distortion Characteristics of Semiconductor Lasers in Optical Fiber Communication Systems", IEEE Journal of Quantum Electronics, vol. QE-18, No. 4, Apr. 1982.
Agrawal, "Effect of Fiber-far-End Reflections on Intensity and Phase Noise in InGaAsP, Semiconductor Lasers", Appl. Phys. Lett. 45(6), Sep. 15, 1984.

*Primary Examiner*—Bruce Y. Arnold
*Assistant Examiner*—Martin Lerner

[57] ABSTRACT

An arrangement for converting diverging polarized laser emission from a semiconductor laser into a convergent beam includes two optical lenses and an optical isolator formed of a Faraday rotator and at least one polarizer arranged in the beam path of the laser emission. The lens which lies farther from the semiconductor layer is a component of the Faraday rotator and is formed by a plano-convex lens having an curved side facing the semiconductor laser.

20 Claims, 2 Drawing Sheets

FEEDBACK-FREE OPTICAL ARRANGEMENT FOR CONVERTING POLARIZED LASER EMISSIONS INTO A CONVERGENT BEAM

BACKGROUND OF THE INVENTION

1. Field of the Invention

The present invention relates generally to an arrangement for converting divergent polarized laser emissions into an at least less divergent beam for feedback-free coupling into, for example, an optic fiber.

2. Description of the Related Art

An arrangement for converting a divergent semiconductor laser emission into a convergent beam for coupling with a monomode optic fiber is known from the publication IEEE Journal of Lightwave Technology, Volume LT-1, No. 1, pages 121-130, March 1983. In the disclosed arrangement, a first lens is composed of a spherical lens element of yttrium-iron-garnet (YIG). A Faraday rotator of the disclosed arrangement is composed of the first spherical lens element with a ring magnet surrounding the lens. A second lens is composed of a rod-shaped, graded index lens having end faces disposed perpendicularly to the propagation direction of the laser emission. A polarizer is arranged in the propagation direction of the laser emission following the second lens in the convergent region of the laser emission. The laser emission, accordingly, is capable of being coupled into a monomode fiber.

Other, known feedback-free arrangements are disclosed in (IEEE Journal of Lightwave Technology, Volume LT-4, No. 2, February 1986; Conference on Optic Fiber Communications (OFC) 1985, San Diego, Calif., paper PD 13-1, 1985; and Conference on Optic Fiber Communication (OFC) 1986, Atlanta, ME 4 1986. In contrast to these other known arrangements, wherein the Faraday rotator is arranged between the spherical first lens and a second lens in the form of a graded index lens or spherical lens and is composed of a disk of YIG inside a ring magnet and arranged obliquely relative to the propagation direction of the laser emission, the first-described arrangement has the advantage that one element is saved.

Such feedback-free arrangements are required for optical communications technology in which semiconductor lasers are becoming increasingly more important. Transmission rates into the gigabit region are possible as a result of the excellent modulation properties of semiconductor lasers. Such high performance transmission systems require high demands on the stability of the operating properties of the semiconductor laser.

Radiation beamed back or reflected back, in the direction of the semiconductor laser, for example laser emissions reflected within or outside of the arrangement, disturbs the operating properties of the laser in an undesirable way when the reflected emission is not blocked but is coupled back into the laser. In particular, reflected radiation leads to fluctuations in the spectrum, the line width, and the instrinsic noise of the laser (see IEEE Journal Quantum Electronics, Volume QE-16, pages 347-355, 1980; IEEE Journal Quantum Electronics, Volumes QE-18, pages 543-555, 1982; and Appl. Phys. Lett., Volume 445, No. 6, pages 597-599, 1984).

The feedback of the reflected radiation on the semiconductor laser can be largely feedback-free arrangements set forth above.

SUMMARY OF THE INVENTION

An object of the present invention is to provide a feedback-free optical arrangement to convert diverging laser emissions into an at least less diverging beam, the arrangement comprising fewer elements than the known arrangements and having a higher coupling efficiency and a higher blocking attenuation than is achieved in the known arrangements.

This and other objects are achieved in an optical arrangement including first and second lenses wherein the second lens is a component part of a Faraday rotator.

This solution is based on the perception that the dimensions of a first spherical lens of YIG as provided in the known arrangements are not favorable for high in-coupling efficiency. Due to the great curvature of the spherical lens, different optical beam lengths are present in the YIG, or other ferrite, lens which leads to a deterioration of the blocking attenuation. Blocking attenuation indicates to what degree the reflected radiation is blocked by an optical isolator. In the arrangement of the present invention, by contrast, a radius and a refractive index of the first lens is selected so that an optimally high in-coupling efficiency is achieved for low reflection from the spherical surface facing the semiconductor laser. This is not possible in the known arrangements for a spherical lens of YIG.

In the known arrangements, the semiconductor laser must be positioned inside the ring magnet of the Faraday rotator with high precision in front of the first lens. This is not required in the present arrangement, so that assembly of the present invention is made considerably easier.

In a further development, the second lens is preferably a plano-convex lens having a curved side facing the semiconductor laser. For this design, the focal length of the second lens and, thus, the ratio of focal lengths of both lenses can be set by the curvature radius of the plano-convex lens. Independently of the focal length of the plano-convex lens, the thickness is such that a 45 degree Faraday rotation occurs within the lens. In addition to imaging the laser beam, the plano-convex lens simultaneously functions as a Faraday rotator. In comparison to the other known arrangements having a YIG disk, one element is saved without having to accept a sacrifice in coupling efficiency.

As a consequence of the curvature of the plano-convex lens, the reflection of the plano-convex lens is considerably less than for a YIG disk. Tilting or oblique placement of the plano-convex lens, a technique used for the disk, and the expense of assemblying the lens in a tilted or oblique arrangement are therefore not necessary.

In contrast to the spherical lens of YIG in the known arrangement, a deterioration of the blocking attenuation due to different optical path lengths hardly occurs with the plano-convex lens because the plano-convex lens is only slightly curved at one side. Blocking attenuation that are just as high as with a YIG disk can thus be achieved with the feedback arrangement of the present invention.

The manufacture of plano-convex lens is simple, because a curvature need be only polished at one side of the ferrite. Due to the shape of the plano-convex lens, the integration of the lens into the ring magnet requires only simple manipulation.

In another development, a polarizer is preferably arranged in a convergent region of the beam path following the Faraday rotator in the propagation direction of the laser emission. When the second lens is a plano-convex lens, the polarizer is easily applied to the lens at the planar side. Thus, an especially compact arrangement is established.

The first lens is composed of a material having, preferrably, a refractive index of less than two, for example of glass, and is preferably in the form of a spherical lens.

Alternately, the first lens can be composed of a material having a refractive index of greater than or equal to two, for example of YIG or Si, and then is preferrably in the form of a plano-convex lens. In this case, it is expedient to arrange the planar side of the plano-convex lens facing the semiconductor laser.

In yet a further development, the two lenses advantageously form a telefocusing system. In such a telesystem, the imaging scale depends only on the ratio of the focals lengths of the two lenses. It is, therefore, simple to dimension the lens system. In the known arrangements described above, the lenses only approximately form a telesystem.

The high blocking attenuation obtainable with the present arrangement is further increased when a second polarizer is used. The second polarizer is required in semiconductor lasers which are also sensitive to polarized radiation beamed back or reflected back perpendicularly to the laser emission and not previously blocked. Such as the case, for example, for distributed feedback (DFB) or dynamic single-mode (DSM) lasers. The second polarizer is preferably arranged between the first lens and the Faraday rotator for space saving reasons.

In another development, the second polarizer is preferrably composed of an interference polarizer in the form of a dielectric multiple layer arrangement disposed at an oblique angle relative to the propagation direction of the laser emission. When the angle of incidence of the beam on the interference polarizer is equal to the Brewster angle, the interference polarizer can be inserted beam path loss free. The polarizer, thus, causes no feedback by the laser. Under ideal conditions, the reflection factor of the polarizer is zero for the emitted laser emission. Should the reflection factor differ from zero due to adjustment errors or due to manufacturing errors in the polarizer, however the emitted laser emission is not reflected back from the polarizer in the direction of the laser but instead is reflected in a different direction. For these reasons, an interference polarizer is generally excellently suited for the present feedback-free optical arrangement including an optical isolator.

The semiconductor laser and the first lens are preferably disposed within an hermetically sealed housing so that it is thus protected against environmental influences. The second polarizer preferably forms a window in the housing. Any lateral offset of the beam path of the laser emission due to the second polarizer is very slight and does not have a disturbing effect on the laser.

As in the prior art, the polarizer which follows the Faraday rotator in the direction of the laser beam is formed of a calcite plate. Preferably, however, the polarizer is also an interference polarizer and is expediently embedded in a block of transparent material which is directly connected to the fiber. The block of transparent material is, for example, a cube of material transparent to the laser emission.

The feedback of the polarizer on the semiconductor laser is very slight because the polarizer is arranged following the Faraday rotator in the propagation direction of the laser emission and is also arranged in a convergent region of the beam path in many applications.

Interference polarizers can be made in great item numbers with constant quality in an automatic process. Antireflection coatings needs not be provided. The interference polarizer is, thus, superior in terms of its properties and manufacturing cost as compared to a polarizer of birefringent crystal material.

DESCRIPTION OF THE PREFERRED EMBODIMENTS

Figure 1:
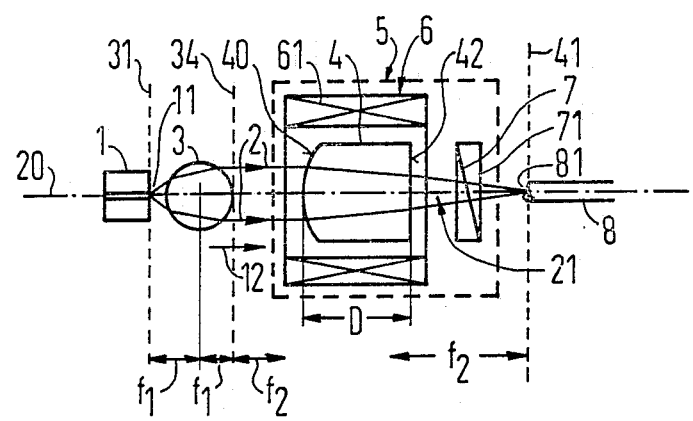
FIG. 1 is a schematic view of an arrangement for coupling laser emissions into a monomode fiber according to the principles of the present invention.

In FIG. 1, an arrangement includes a semiconductor laser 1 which is, for example, a laser diode, along with a first lens 3, an optical isolator 5, and a monomode fiber 8 arranged in succession in a defined direction 12 along an optical axis 20. The first lens, for example, is a spherical lens of glass. The semiconductor laser 1 is arranged relative to the first lens 3 so that a spot 11 on the laser diode 1 from which the laser emission emerges is disposed on the optical axis 20 in a subject-side focal plane 31. The laser emission is emitted divergently from the spot 11 in the defined direction 12 parallel to the optical axis 20. The defined direction 12 is, thus, the propagation direction of the semiconductor laser 1. The first lens 3 converts the emission into a parallel ray beam propagating in the propagation direction 12, which impinges the optical isolator 5. The beam path of the laser emission is denoted 2 in FIG. 1.

The optical isolator 5 is formed of a Faraday rotator 6 having a plano-convex lens 4 of ferrite that is surrounded by a ring magnet 61 and of a polarizer 7 arranged following the plano-convex lens 4 in the propagation direction 12. The plano-convex lens 4 of ferrite is of, for example, YIG.

The plano-convex lens 4 is arranged so that a convex side 40 faces the semiconductor laser 1 and/or the first lens 3. A subject-side focal plane of the plano-convex lens 4 coincides with an image-side focal plane 34 of the first lens 3. As a result, the two lenses 3 and 4 form a confocal system or telefocusing system which images the spot 11 onto an image-side focal plane 41 of the plano-convex lens 4. An end 81 of the monomode fiber 8 into which the laser emission is coupled is arranged at the image of the spot 11 in the focal plane 41.

An interference polarizer 7, which is composed of a dielectric multiple layer element arranged at an oblique angle relative to the optical axis 20 and which is embedded in a block 71 of glass, is arranged between the plano-convex lens 4 and the fiber 8. The interference polarizer 7 is, thus, disposed in a convergent region 21 of the beam path 2 of the laser emission. The polarizer 7 can either be attached to a planar side 42 of the plano-convex lens 4 and/or be directly connected to the fiber 8.

A thickness D of the plano-convex lens 4 is selected to provide a Faraday rotation of approximately 45 degrees. The thickness D is selected independently of the focal length of the plano-convex lens 4.

For maximum coupling efficiency of the laser emission into the fiber 8, a spot radius of the spot 11 must be transformed into a spot radius which corresponds to the spot radius of the optic fiber 8. In a confocal system, the magnification factor, which is the ratio between the spot radius of the fiber and the spot radius of the spot 11, is directly established by the ratio between the focal length f of the second lens 4 and the focal length f of the first lens 3. For an exemplary coupling between a semiconductor laser 1 and a monomode fiber 8, the magnification factor lies in the region of between 4 to 5. The ratio between the focal lengths is correspondingly selected.

To keep coupling losses due to aberrations in the first lens 3 as low as possible, the radius of the first lens 3 is as small as possible and its refractive index should be optimally high.

In an exemplary embodiment of an arrangement according to FIG. 1 for a laser radiation having a wavelength of 1.3 micrometers, a spherical lens of glass having a refractive index of 1.818 and a radius of 0.5 mm is selected. The focal length f of this spherical lens accordingly amounts to 0.556 mm as a consequence of the magnification factor of between 4 to 5 prescribed for the laser diode 1 and the monomode fiber 8, the focal length f of the plano-convex lens 4 is defined as between approximately 2.224 through 2.780 mm. Within the given wavelength, the refractive index of the plano-convex lens 4 of YIG is 2.2. Accordingly, the radius of the curved side 40 of the plano-convex lens 4 is selected to be between 2.67 through 3.34 mm to achieve the correct focal length. In order to achieve a Faraday rotation of 45 degrees for the specified wavelength, the thickness D of the plano-convex lens is approximately 2 mm.

Figure 2:
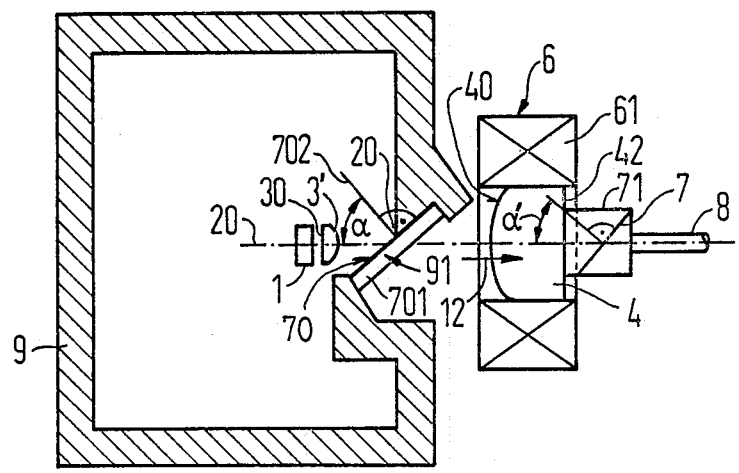
FIG. 2 is a schematic illustration of an arrangement similar to that shown in FIG. 1 which also includes a further polarizer as a first lens in the form of a window in a housing shown in section about the semiconductor laser.

An arrangement according to FIG. 2 differs from the arrangement shown in FIG. 1 in that a further polarizer 70 forming a window 91 in a housing 9 which encloses the semiconductor laser 1 is arranged between the first lens 3 and the Faraday rotator 6. The first lens 3', for example, is a plano-convex lens having a planar side 30 facing toward the semiconductor laser 1. The further polarizer 70 is in the form of an interference polarizer which is of a dielectric multiple layer element on a glass substrate 701 that is fixed to the housing 9. The polarizer 70 is disposed at an oblique angle relative to the propagation direction of the laser emission. The angle at which the polarizer 70 is disposed is selected so that the angle of incidence a measured relative to a perpendicular 702 of the polarizer 70 is equal to the Brewster angle.

As in the arrangement of FIG. 1, the first polarizer 7 in the arrangement of FIG. 2 is also composed of a dielectric multiple layer element embedded in a block 7 and preferrably inclined at an angle relative to the axis 20 such that the angle of incidence $a'$ is equal to the Brewster angle. The block 71 is attached to the planar side 42 of the plano-convex lens 4 and is also directly connected to the fiber 8.

Figure 3:
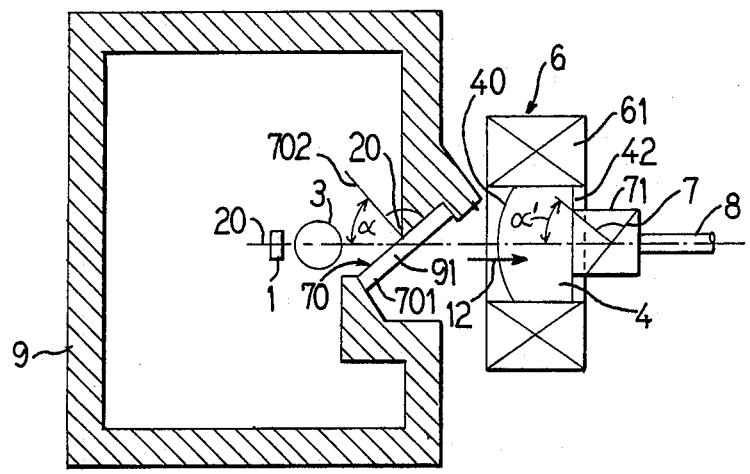
FIG. 3 is a schematic view of an arrangement similar to FIG. 2 except that the first lens is a spherical lens.

In FIG. 3, the first lens 3' of plano-convex shape of FIG. 2 is replaced by a spherical lens 3 as in FIG. 1.

Although other modifications and changes may be suggested by those skilled in the art, it is the intention of the inventors to embody within the patent warranted hereon all changes and modifications as reasonably and properly come within the scope of their contribution to the art.

We claim:

1. A feedback-free optical arrangement for converting a divergently emitted polarized laser emission from a semiconductor laser into an at least less divergent beam, comprising:
   a first optical lens in a beam path of the laser emission from the semiconductor laser;
   a second optical lens arranged following said first optical lens in a propagation direction of the laser emission from the semiconductor laser, said second optical lens having a curvature on at least one face and having an axis lying parallel to the propagation direction of the semiconductor laser;
   an optical isolator formed of at least one polarizer in the beam path of the laser emission;
   a Faraday rotator having said second optical lens as a component part; and
   said second optical lens being disposed within said Faraday rotator.

2. A feedback-free optical arrangement as claimed in claim 1, wherein said second optical lens is a plano-convex lens having an curved side facing toward the semiconductor laser.

3. A feedback-free optical arrangement as claimed in claim 2, wherein said at least one polarizer is attached to said plano-convex lens at a planar side.

4. A feedback-free optical arrangement as claimed in claim 3, wherein said at least one polarizer is connected to an optical fiber.

5. A feedback-free optical arrangement as claimed in claim 1, wherein said at least one polarizer is arranged following said Faraday rotator in the propagation direction of the laser emission.

6. A feedback-free optical arrangement as claimed in claim 1, wherein said first optical lens is of a material having a refractive index of less than 2 and is formed as a spherical lens.

7. A feedback-free optical arrangement as claimed in claim 1, wherein said first optical lens is of a material having a refractive index of at least 2 and is formed as a plano-convex lens.

8. A feedback-free optical arrangement as claimed in claim 7, wherein a planar side of said plano-convex first optical lens faces the semiconductor laser.

9. A feedback-free optical arrangement as claimed in claim 1, wherein said first and second optical lenses form a telefocussing system.

10. A feedback-free optical arrangement as claimed in claim 1, wherein said at least one polarizer includes a further polarizer arranged in the beam path of the laser emission between the semiconductor laser and said Faraday rotator.

11. A feedback-free optical arrangement as claimed in claim 10, wherein said further polarizer is arranged between said first optical lens and said Faraday rotator.

12. A feedback-free optical arrangement as claimed in claim 10, wherein said further polarizer is an interference polarizer disposed at an oblique angle relative to a propagation direction of the laser radiation.

13. A feedback-free optical arrangement as claimed in claim 10, further comprising:
   a housing containing the semiconductor laser; and
   said further polarizer being a window in said housing.

14. A feedback-free optical arrangement as claimed in claim 1, wherein said at least one polarizer is an interference polarizer.

15. A feedback-free optical arrangement as claimed in claim 14, wherein said interference polarizer follows said Faraday rotator in the propagation direction of the laser emission and said interference polarizer is embedded in a block of material transparent to the laser emission.

16. A feedback-free optical arrangement as claimed in claim 15, wherein said block of transparent material is connected directly to an optical fiber.

17. A feedback-free optical arrangement for converting diverging polarized laser emissions emitted from a semiconductor laser diode into a converging beam for coupling into an optical fiber, comprising:
- a first spherical lens in a beam path of the semiconductor laser emission;
- a Faraday rotator in the beam path of the semiconductor laser emission following said first spherical lens in a propagation direction, said Faraday rotator including
  - a second plano-convex lens having a convex side facing said first spherical lens and a substantially planar side opposite said convex side, said plano-convex lens being of a ferrite and having a thickness sufficient to provide a Faraday rotation of approximately 45 degrees,
  - a ring magnet disposed about said plano-convex lens, and
- a polarizer in the beam path of the semiconductor laser emission following said second plano-convex lens in the propagation direction so that the laser emission is focussed from said Faraday rotator into optical fiber.

18. A feedback-free optical arrangement as claimed in claim 17, wherein said first spherical lens has a focal plane, and the semiconductor laser diode is disposed in said focal plane so that laser emissions that have passed through said first spherical lens are in substantially parallel rays.

19. A feedback-free optical arrangement as claimed in claim 17, wherein said polarizer includes a multiple layer dielectric element disposed at an angle to said propagation direction, and said polarizer is embedded in a block of substantially transparent material.

20. A feedback-free optical arrangement as claimed in claim 19, wherein said block of substantially transparent material is affixed to said substantially planar side of said second plano-convex lens.

* * * * *